United States Patent [19]

Sampson

[11] 4,437,208
[45] Mar. 20, 1984

[54] MEAT TENDERIZER

[76] Inventor: Jacob Sampson, 6138 N. Clark St., Chicago, Ill. 60660

[21] Appl. No.: 342,518

[22] Filed: Jan. 25, 1982

Related U.S. Application Data

[63] Continuation-in-part of Ser. No. 177,278, Aug. 11, 1980, Pat. No. 4,360,952.

[51] Int. Cl.³ .............................................. A22C 9/00
[52] U.S. Cl. ......................................................... 17/26
[58] Field of Search ...................................... 17/25, 26

[56] References Cited

U.S. PATENT DOCUMENTS

| | | |
|---|---|---|
| 311,199 | 1/1885 | Moulton ................................ 17/26 |
| 525,508 | 9/1894 | Nickles, Jr. et al. .................. 17/26 |
| 700,500 | 5/1902 | Jaques .................................. 17/26 |
| 2,420,549 | 5/1947 | McKee et al. ........................ 17/26 |
| 4,133,075 | 1/1979 | Collins ................................ 17/26 |
| 4,270,244 | 6/1981 | Lo Biondo et al. .................. 17/52 |

Primary Examiner—Willie G. Abercrombie

[57] ABSTRACT

A meat tenderizing machine formed of a pair of spaced parallel surfaces moving in the same direction but with one surface moving at a speed differing from the other with ribs extending crosswise in longitudinally spaced apart relation from the surfaces for engagement with the meat during passage between the surfaces whereby the meat is stretched during passage between said surfaces while in engagement with said ribs.

6 Claims, 5 Drawing Figures

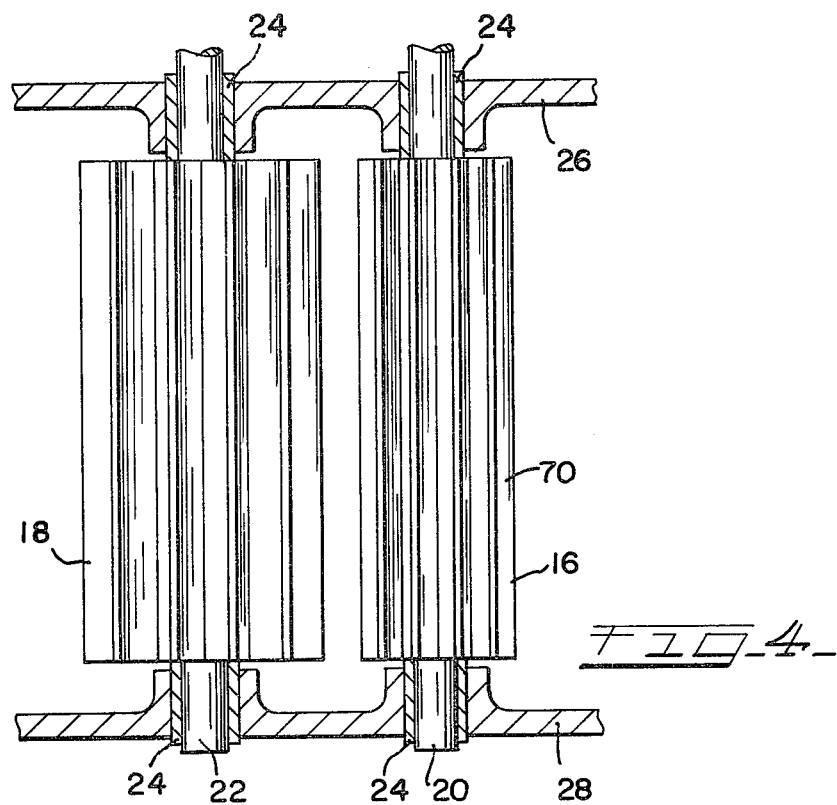
*Fig-4-*
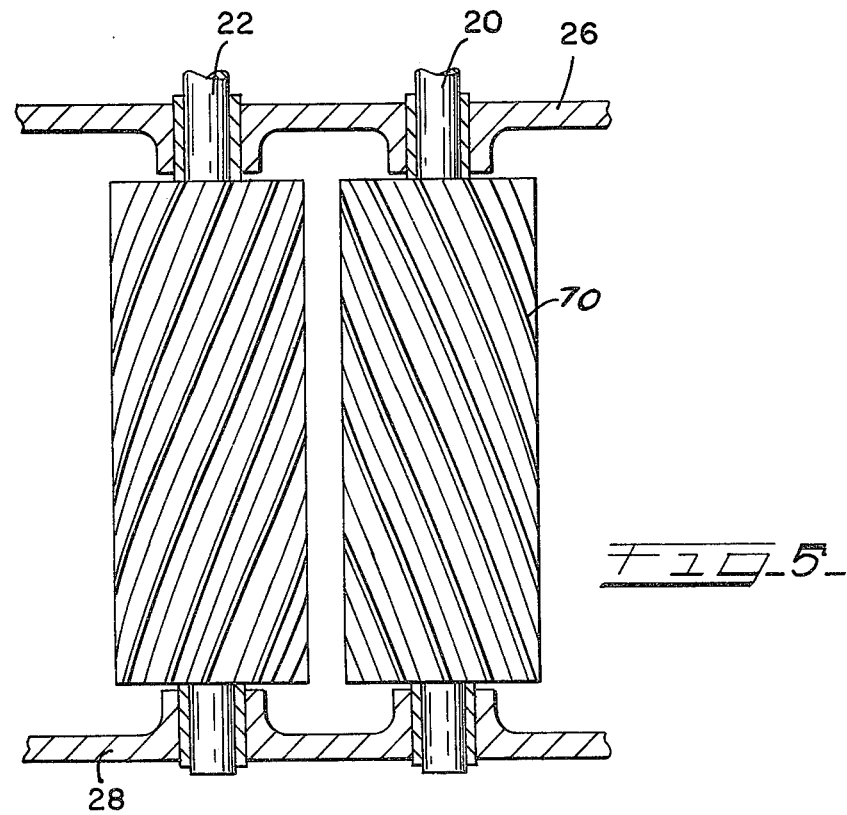
*Fig-5-*

MEAT TENDERIZER

This is a continuation-in-part of my copending application Ser. No. 177,278, filed Aug. 11, 1980, now U.S. Pat. No. 4,360,952, issued Nov. 30, 1982 and entitled "Meat Tenderizer".

This invention relates to the tenderization of cuts of meat and it relates more particularly to a method and means for the tenderization of cuts of meat by mechanical means as distinguished from chemical, electrical or enzymatic means.

In my aforementioned copending application, description is made of a method and means for the tenderization of slabs of meat by advancing the meat between a pair of spaced surfaces, such as rollers mounted for rotational movement, with the surfaces having truncated members projecting from the surfaces in the direction towards each other whereby the slab of meat is engaged during passage between the surfaces. Means are provided for displacement of one surface at a linear speed greater than the other, whereby the portions of the meat slab engaged between the surfaces are subjected to a positive stretching action. This stretching of the meat, during passage between the surfades, has been found to be effective to bring about a noticeable tenderization of the meat.

Such mechanical tenderization is believed to result directly from the stretching action and/or the severance of muscle tissues in response to such stretching action.

This is to be distinguished over the process described in the U.S. Pat. No. 4,270,244 wherein the meat slab is subjected to a slitting and crushing action which not only releases the meat juices but also crushes the meat cells to give the effect of a chopped meat from which much of the flavoring juices have been lost.

Others have sought to effect tenderization of meat by slitting as in U.S. Pat. No. 2,853,199 or pounding as in U.S. Pat. No. 3,234,589, but these too rely on the severance or breakdown of the meat cells, with correspond- FIG. 1 is a side elevational view of a meat tenderizing machine embodying the features of my invention;

FIG. 4 is a view similar to that of FIG. 2, showing a modification in roller design; and FIG. 5 is a view similar to that of FIG. 4, showing a further modification in roller design.

Figure 1:
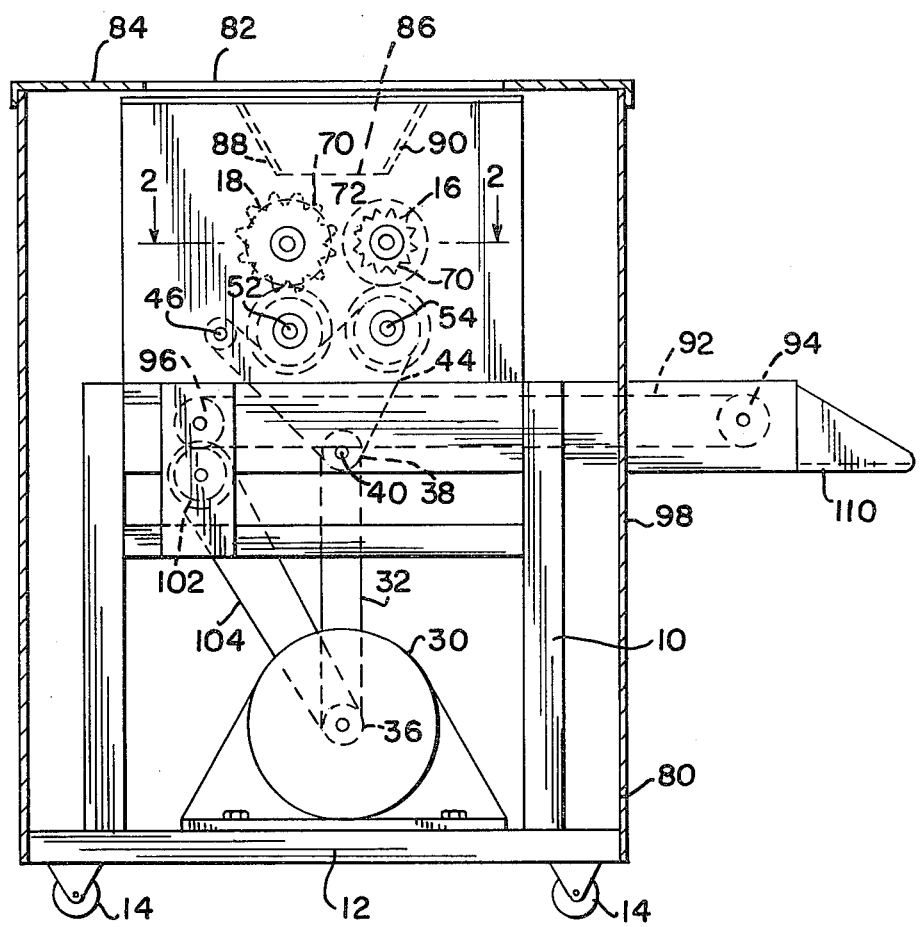

In the drawings, illustration is made of a frame 10 mounted on a pedestal 12 supported on rollers 14 for movement of the machine from place to place.

The machine of this invention embodies a pair of meat engaging surfaces, illustrated as a pair of horizontally disposed laterally spaced apart rolls 16 and 18 fixed onto parallel shafts 20 and 22. The end portions of the shafts 20 and 22 are mounted for free rotational movement in journals 24 secured in the opposite side walls 26 and 28 of the frame member 10.

In the illustrated modification, the rolls 16 and 18 are adapted to be driven in rotational movement by an electrical motor 30 mounted on the pedestal 12. An endless chain 32 or belt operatively connects a sprocket 34 on the motor shaft 36 with a sprocket 38 fixed onto a stub shaft 40 mounted for free rotational movement to the side wall 26 of the frame member 10. A driving sprocket 42 fixed for rotational movement with the stub shaft 40 is interconnected by an endless chain 44 trained about a take-up sprocket 46 and laterally spaced apart sprockets 48 and 50 secured onto stub shafts 52 and 54 journaled onto the side wall 26 of the frame member 10 (FIG. 3).

Figure 2:
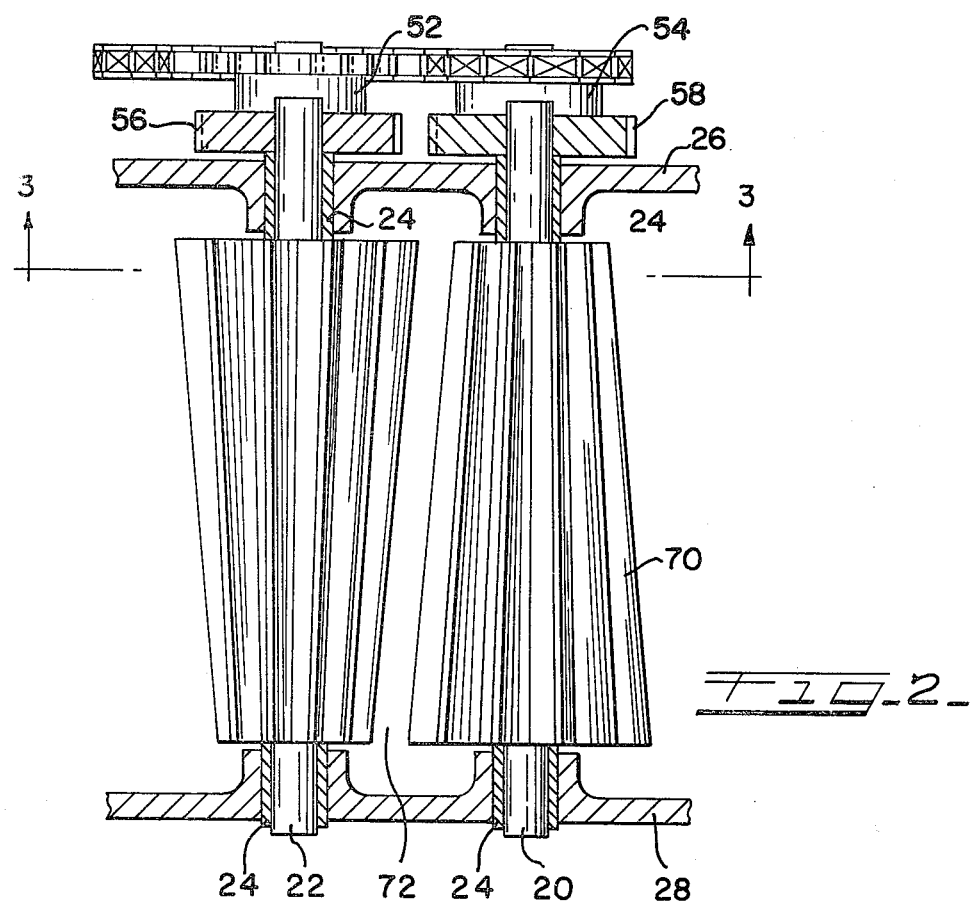
FIG. 2 is a sectional view taken along the lines 2—2 of FIG. 1.
Figure 3:
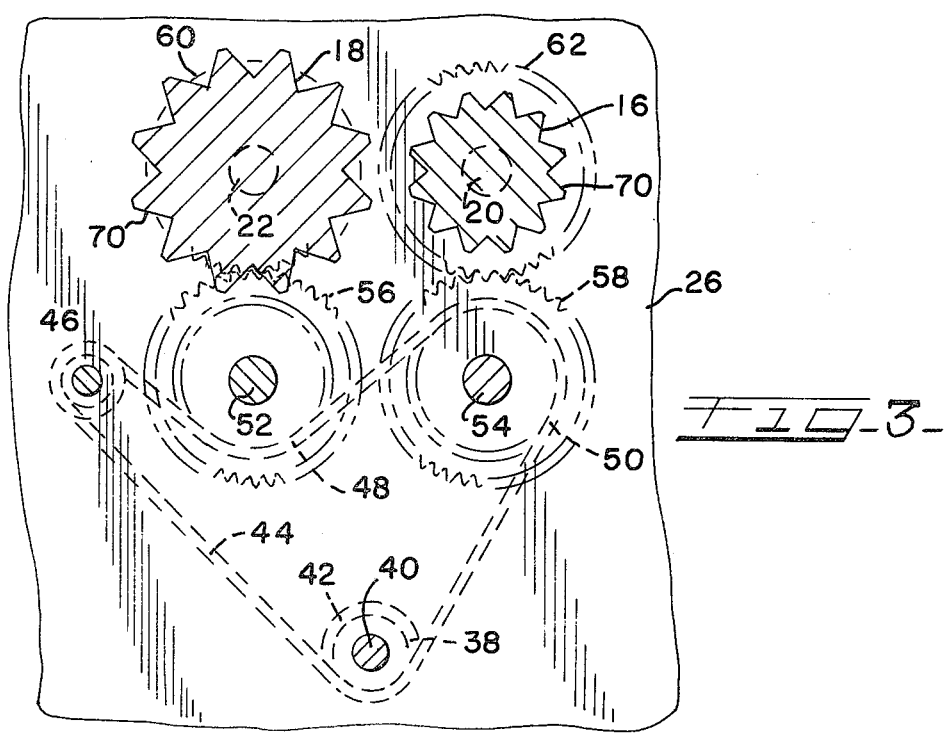
FIG. 3 is a sectional view taken along the lines 3—3 of FIG. 2.

As shown in FIGS. 2 and 3, the shafts 52 and 54 mount gears 56 and 58 dimensioned to mesh with the gear teeth 60 and 62 fixed onto the end portion of the roll shafts 20 and 22 whereby the rolls 16 and 18 are rotated in opposite directions in response to actuation by the driving motor 30.

In accordance with the practice of this invention, the

The ribs 70 are preferably dimensioned to extend continuously across the surfaces of the rolls 16 and 18, with the ribs circumferentially spaced about ½ to 1½ inches apart. Instead, the circumferentially spaced ribs 70 can be subdivided axially into shorter segments of 2 to 5 inches with the segments axially aligned in closely spaced apart relation to span the surfaces of the rolls.

In the modification shown in FIG. 4 of the drawings, the rolls 16 and 18 are in the form of cylindrical members of uniform diameter throughout their lengths. The desired differential in surface travel during conjoint rotational movement of the rolls is achieved by a differential in roll diameter with one roll 16 having a diameter less than the diameter of the roll 18. Thus at the same R.P.M., the peripheral ribbed surface of the roll 18 will travel at a speed greater than the ribbed peripheral surface of the roll 16. The desired differential in surface travel betwen the rolls can also be achieved in the manners described in my aforementioned copending application as by differential in the number of teeth in the gear 70 of one roll as compared to the number of gear teeth in the other whereby the one with the greater number of gear teeth will rotate at a lesser R.P.M. than the other, with the roll diameters being the same or different, as previously described.

In another modification illustrated in FIG. 2, the rolls 16 and 18 are in the form of frusto-conical members of substantially the same cone angles but in an inverted arrangement with the base of one roll laterally aligned with the apex portion of the other roll to align the adjacent surfaces in substantially parallel relation to provide a spacing 72 of uniform dimension therebetween through which the meat slab is passed.

By this modification, the desired differential in speed between the adjacent surfaces of the rolls is achieved by reason of the fact that the portion of the roll of larger diameter is adjacent the portion of the other roll of smaller diameter, with substantially the same speed occurring only at the axial center of the rolls where the rolls are substantially of the same diameter. In this modification, it is possible to include differences in the diameters of the rolls, as in FIG. 4, and/or differences in gear ratios as previously described.

In a preferred modification, shown in FIG. 5, the ribs 70 project from the peripheral surfaces of the rolls 16 and 18 in the form of helical members in which the pitch of the helix in one roll is opposite the pitch of the helix in the other so that the helical members will be substantially at an opposite angle during engagement of the meat slab in between. By this modification, in addition to the stretching of the meat in the lengthwise direction during passage between the rolls, the meat slab will concurrently be subjected to positive stretching forces in the crosswise or axial direction, with or without differential in the peripheral surface speed of the rolls. Stretching action will, of course, be maximized by differential in peripheral surface speed of the rolls which can be accomplished by either of the techniques previously described. The desirable results can be made available with ribs which spiral at a low angle such as 2-20 degrees.

For purposes of protection and sanitation, the described machine is enclosed within a housing 80 having an opening 82 in the top wall 84 in vertical alignment with the space 72 between the roll pair. Vertically aligned with the space 72 is a feed slot 86 having guide walls 88 and 90 extending angularly upwardly and outwardly therefrom for suspension from the frame member for guiding the meat into the bight between the roll pair.

Means are also provided, as described in my aforementioned copending application, for adjustment of one roll in the direction toward and away from the other roll to increase or decrease the spaced relation between the peripheral surfaces of the rolls to accommodate meat slabs of different thicknesses.

Means are provided for delivery of the processed meat for access outside the housing. In the modification illustrated in FIG. 1 of the drawings, such delivery means comprises an endless belt 92 operative about horizontally disposed rollers 94 and 96 for travel across the housing from a position underlying the roll pair, through an opening in the side wall 98 of the housing to a delivery platform 100 outside of the housing. The roller 94 is an idler roller while the roller 96 is a driven roller operatively connected via gear 102 and endless belt or chain 104 to a sprocket secured to the shaft of the electrical motor 36. Thus in response to the operation of the electrical motor to rotate the rolls 16 and 18, the endless belt is operated to deliver meat passing between the rolls.

In operation, the electrical motor is energized to rotate the rolls 16 and 18 and to effect operation of the delivery belt. Meat slabs are fed downwardly through the feed chute 88-90 for passage into the bight between the rolls 16 and 18. Upon entry into the space between the rolls, the meat slab is positively engaged on opposite sides between the ribs 70 projecting from the peripheral surfaces of the rolls whereby the meat slab is displaced downwardly through the space between the rolls. While engaged between the rib members, the meat is subjected to a strong and positive stretching action responsive to the differential in peripheral speed between the rolls. While the stretching action is positive in the lengthwise direction, a degree of stretching in the crosswise direction will also result from the resilient character of the meat.

Stretching in the lengthwise direction will be augmented by a positive stretching action in the crosswise direction, as when the meat engaging ribs are in the form of helical or spiral members, as illustrated in FIG. 5.

As a result of such positive stretching action in the lengthwise direction alone or in combination with crosswise stretching, a high degree of tenderness is imparted to the meat without excessive release of the meat juices. This is believed to result from the fact that such stretching action tends to break the muscle tissues without excessive severance of the meat cells whereby the meat juices are retained for flavor and for tenderness. Best results are obtained at 28°-30° F.

Upon release of the meat slab from between the roll pair, the processed meat falls gravitationally onto the top run of the belt for lateral displacement from the housing to the delivery table 110.

The meat processed in accordance with the practice of this invention differs materially from the tenderness and taste of meat sought to be tenderized by a pounding or pressing action or by a slicing action.

The rib action on the meat gives the meat an appearance similar to that of a grilled meat thereby to enhance the attractiveness of the meat product especially after preparation as by cooking, frying, broiling or grilling.

Tenderization of meat by the method and means described is effective with various cuts of meat such as beef, veal, pork and poultry although best results are experienced with red meats, such as beef.

The amount of stretching should be sufficient to achieve separation of some of the muscle tissues between the portions engaged by the ribs. Stretching by as little as 5 percent results in improved tenderness with the amount of tenderness increasing with increase in the amount that the meat is stretched during engagement between the ribs. In practice, the amount of stretching will usually range up to 20–35 percent.

Formation of the roll pair with ribs which project substantially continuously axially across the surfaces of the rolls enhances the ability to maintain the rolls in a clean sanitary condition thereby to enhance the utility of the machine.

It will be apparent from the foregoing that I have provided a new and simple meat tenderizing machine which operates on mechanical principles in an effective and sanitary fashion thereby to enhance the processing of the meat to raise the tenderness level of meat.

It will be understood that changes can be made in the details of construction and arrangement, without departing from the spirit of the invention, especially as defined in the following claims.

I claim:

1. A meat tenderizing machine comprising a pair of surfaces in spaced parallel relation for passage of the meat therebetween, each surface having a plurality of longitudinally spaced, crosswise extending ribs projecting from the surface whereby the meat is engaged therebetween during passage of the meat between the surfaces, and means for moving the surfaces for travel of the adjacent surfaces in the same direction but with the ribs of one surface moving relative to the other to stretch the meat during passage between the surfaces while being engaged between said ribs, the surfaces comprising a pair of rolls mounted for rotational movement, the rolls being in the form of frusto-conical members of substantially the same cone angle, with the base of one frusto-conical member positioned alongside the apex of the other frusto-conical member whereby adjacent peripheral surfaces travel at substantially the same RPMs.

2. A meat tenderizing machine as claimed in claim 1 in which one roll is of larger average diameter than the other whereby the peripheral surface of the one roll travels at a speed higher than the other at substantially the same RPM.

3. A meat tenderizing machine as claimed in claim 1 which includes means for rotating one roll at an RPM higher than the other whereby the peripheral surface of the one roll travels at a speed higher than the other.

4. A meat tenderizing machine as claimed in claim 1 in which the ribs extend spirally from the surfaces of the rolls as opposite helical members, whereby the meat is stretched in the crosswise direction as well as the lengthwise direction during passage in engagement with the rolls.

5. A meat tenderizing machine as claimed in claim 1 which includes means for adjustment of the rolls in the direction towards and away from each other to increase or decrease the spaced relation therebetween.

6. A meat tenderizing machine as claimed in claim 1 in which the ribs extend substantially continuously across the surfaces.

* * * * *